Patented Oct. 21, 1952

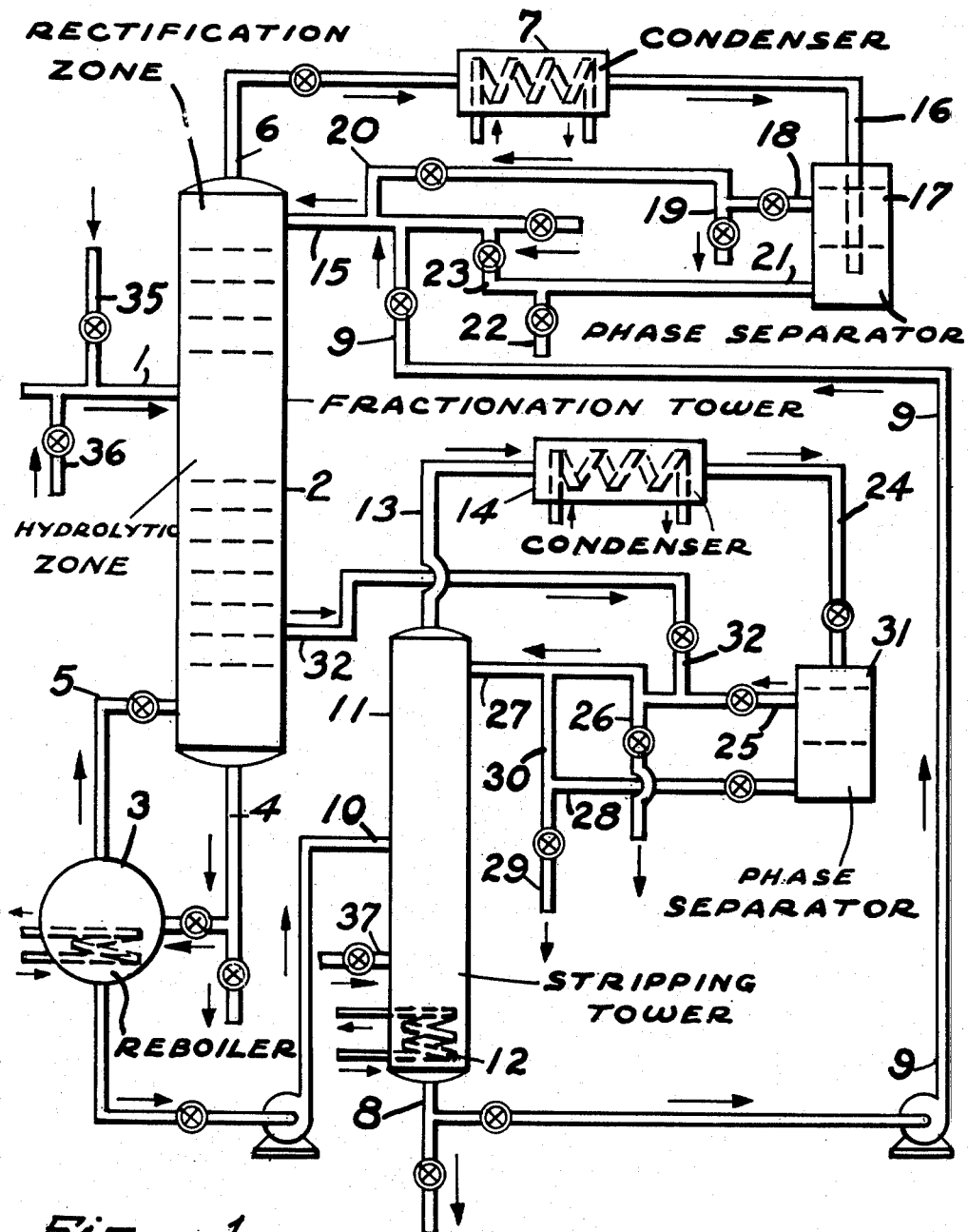

2,614,970

UNITED STATES PATENT OFFICE 2,614,970

EXTRACTIVE DISTILLATION OF ALCOHOL-ALDEHYDE SOLUTIONS

Charles E. Morrell, Westfield, N. J., Joseph Stewart, Brooklyn, N. Y., and Carl S. Carlson, Elizabeth, N. J., assignors to Standard Oil Development Company, a corporation of Delaware Application August 26, 1949, Serial No. 112,578

16 Claims. (Cl. 202—39.5)

This invention relates to an improved method for the recovery of aldehydes and alcohols from liquid mixtures by a combined hydrolysis and distillation method, and, more specifically, it relates to a distillation method of aldehyde and alcohol recovery with simultaneous hydrolysis of hydrolyzable compounds present.

Some of the more difficult separations which arise in the course of manufacture and purification of organic chemicals are those involving the separation of mixtures of close-boiling oxygenated compounds in which these are compounds both of the neutral and polar types. The problem is especially acute when mixtures substantially consist of neutral components having relatively close-boiling points since separation of such mixtures by ordinary distillation operations into fractions of relatively pure chemical compounds is generally quite difficult. The separation problem is additionally aggravated when such mixtures contain chemical compounds which have reacted with each other in some fashion chemically to give derivatives requiring subsequent breakdown to the original components or when the individual compounds in the mixtures react under conditions existing in the separation steps, as in the hot zones of a rectifying column, to yield derivatives which require a breakdown before full recovery of products from the feed stock can be realized.

These mixtures of compounds presenting technical problems of separation can be obtained in a variety of ways including a number of chemical processes either presently or potentially of great commercial importance. For instance, mixtures containing close-boiling oxygenated components are frequently encountered in industrial operations in such widely used reactions as oxidations, reductions, or synthetic reactions such as the Fischer-Tropsch and the Oxo type conversions.

This invention permits simultaneous hydrolysis and recovery of individual pure components, including those produced by the hydrolysis. Mixtures of aldehydes, ketones and alcohols have been found to be especially difficult to separate into their constituents since these compounds readily react with each other in the presence of various materials in catalytic amounts or even under the influence of heat alone to give complex mixtures of impure aldehydes, alcohols, acetals, ketals, hemiacetals, unsaturated ethers and other higher molecular weight materials whose formation substantially reduces the yield of pure aldehyde and alcohol which can be recovered directly by known separation methods such as by simple distillation or by chemical separations.

One outstanding and important example of processes wherein such mixtures of aldehydes, alcohols, and their reaction products, the acetals, hemiacetals, unsaturated ethers and others, are readily and commonly obtained, is the "Oxo" reaction, consisting of a combined oxonation and hydrogenation reaction. This reaction is commonly carried out by reacting, under suitable conditions of temperature and pressure, organic compounds having an olefinic double bond with gas mixtures containing carbon monoxide and hydrogen in the presence of suitable catalysts to give mixtures consisting, to a large extent, of aldehyde compounds having one more carbon atom than was present in the olefin starting feed. Small amounts of alcohols and various acetals, esters and other organic products are usually also formed.

Generally speaking, the more or less impure aldehydic oxygenated product from the oxonation step is subjected to a second step, a hydrogenation to convert the aldehyde compounds into alcohols, that is, broadly speaking, essentially all the carbonyl groups are converted to hydroxyl groups by this second step.

These reactions may be summarized in a formalized manner as follows:

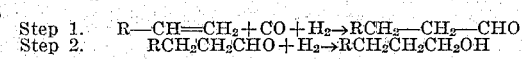
Step 1.  R—CH=CH₂+CO+H₂→RCH₂—CH₂—CHO
Step 2.  RCH₂CH₂CHO+H₂→RCH₂CH₂CH₂OH Each of these steps results in a product or rather a mixture of various products, chiefly consisting of aldehydes and alcohols together with lesser amounts of their condensation and reaction products such as acetals, hemiacetals, esters, unsaturated ethers, and various higher molecular weight materials.

As to the types of olefins which may be subjected to the oxonation reaction, these vary and, in general, include compounds having carbon to carbon unsaturation and from $C_2$ to $C_{15}$ carbon atoms, thus yielding oxygenated compounds of the $C_3$ to $C_{16}$ range. Those olefinic compounds of the $C_7$—$C_8$ range have been particularly studied in connection with the commercial production of $C_8$ and $C_9$ aldehydes and alcohols. Active interest has also been exhibited in production of propionaldehyde, butyraldehydes, and valeraldehydes and their corresponding alcohols. It has further been noted that, in the oxonation and hydrogenation steps, the acetals and other higher molecular weight impurities which form by interaction of the aldehydes and alcohols, appear to build up to a much greater extent in products in which at least a part of the product is recycled. Such recycling operations are common as an economic expediency in commercial operations.

These mixtures of neutral oxygenated compounds including aldehydes, alcohols, ketones, ketals, acetals, and hemiacetals, can be separated, at least partially, into their chemical components by ordinary distillation and fractionation methods. It is also possible to effect separations of such neutral oxygenated compounds by means of extractive distillation techniques by which the volatilities of the close-boiling components are so altered in the presence of water and aqueous solutions introduced into the fractionation zone, that pure products may readily be separated as streams selected from appropriate locations of the fractionation zone. By the use of suitable concentrations of water, it is frequently even possible to substantially alter the normal volatilities of the individual organic materials, thereby permitting otherwise impossible separations and rendering more efficient those already possible. It has been found possible, for instance, to separate alcoholic compounds from non-alcoholic compounds by means of water extractive distillation techniques as a class separation.

In separating mixtures of oxygenated compounds as, for example, mixtures obtained by oxonation and hydrogenation processes and various mixtures obtained by oxidation of hydrocarbons, containing appreciable quantities of aldehydes, ketones, and alcohols occurring together in the same mixtures, a special problem is encountered. Such mixtures always contain at least small amounts of acetals, ketals, hemiacetals, unsaturated ethers and various other higher molecular weight reaction products of the original simple compounds. A typical formulation of the equilibrium existing is as follows:

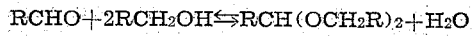

$$RCHO + 2RCH_2OH \rightleftharpoons RCH(OCH_2R)_2 + H_2O$$

The acetal formed in the previous reaction, on mild heating such as would occur during an atmospheric pressure distillation may be partially converted to unsaturated ethers by the mechanism of the following equation:

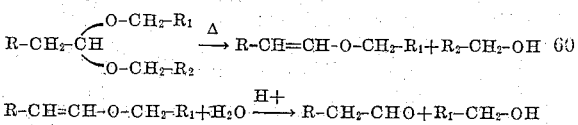

Thus the acetals can be converted to the unsaturated ethers which are, in turn, hydrated in the presence of hydrogen ions to give aldehyde and alcohol by combined hydrolysis and rearrangement reactions.

In mixtures containing carbonylic and hydroxylic compounds, the formation of substantial quantities of reaction products such as acetals, hemiacetals and unsaturated ethers, always occurs and such formation is accelerated and intensified by simple standing, distillation, or storage, by the presence of small amounts of acids such as carboxylic acids and sulfur-containing materials, as well as by other impurities, and by exposure to moderate heat conditions.

This invention has as a principal object the separation of mixtures containing aldehydes and alcohols and their reaction products thereby obtaining maximum yields of pure aldehyde and alcohol products.

Another object of this invention is the separation of mixtures of aldehydes, alcohols, and their reaction products employing simultaneous hydrolysis and extractive distillation within a fractionation zone.

An additional object is to accomplish the separation of relatively close-boiling aldehydes and alcohols by distillation, meanwhile avoiding the formation of reaction products such as acetals, hemiacetals, ketals and unsaturated ethers within the separation zone.

Other objectives of this invention will be obvious to those skilled in the art and will appear hereinafter throughout the description and operation of the process.

It has been found that aldehyde- and alcohol-containing mixtures may readily be separated into their pure components with high yields of the pure chemical products by a modified water extractive distillation method which is combined with an acidic hydrolytic action to break up the acetals and similar hydrolyzable impurities and give additional quantities of alcoholic and aldehydic products, which would otherwise be unavailable. It is very important to avoid getting a fraction of either alcohol or aldehyde which is contaminated by even small amounts of the other components since such mixtures will recombine to give additional amounts of the high-boiling condensed impurities, thereby requiring purification operations.

This effective and highly useful combined hydrolytic and distillation effect is achieved by the catalyzed hydrolysis of the acetals and other decomposable products, generally by the use of acid or acid-reacting materials as catalysts, and at the same time, by employing a fractionation under aqueous extractive distillation conditions. In carrying out the combined operation, the aqueous reflux within the column should be acidic to the extent of at least catalytic proportions.

The terminology which will be employed throughout this description will be to use the term solvent to include both the water and the solubilizers and auxiliary agents employed to get hydrolysis and effective fractionation.

It has been found operable to use extractive distillation solvent concentrations in the range of 25 to 99 mole per cent. The preferred mode of operation will vary with the molecular weight of the materials being separated. For the reaction products of $C_3$ and $C_4$ aldehydes and alcohols, the preferred solvent concentration will be 40 to 70 mole per cent. For $C_5$ and higher molecular weight aldehyde and alcohol reaction products the preferred solvent concentration will be 90 to 99 mole per cent. Under such conditions, the aldehyde, or more broadly speaking, the carbonyl compound which is generally more volatile than the corresponding alcohol, is obtained overhead from the fractionation zone while the alcohol is recovered together with any other relatively non-volatile material as a dilute aqueous bottoms stream from the lower portion fractionation zone. A stream consisting of pure alcohol contaminated chiefly by water may be removed from a lower plate in the tower rather than as bottoms, if desired.

The lower limit of operative solvent concentration is governed mainly by the molecular weight and general solubility properties of the alcohols and aldehydes being separated as well as the acetals being hydrolyzed. A further restriction is that a quantity of water should be added to the fractionation zone in excess over that necessary to form the aqueous azeotrope with all the aldehyde being removed so that the required water concentration is maintained throughout the column to permit the hydrolysis of the acetals to proceed satisfactorily. The upper limit as to solvent concentration within the fractionating zone is generally set by the economics and practicability of commercial operation.

As an additional and very important feature of the invention, it is of vital importance to employ, as the aqueous solvent liquid, aqueous mixtures of selected and specific compounds which may broadly be called solubilizers or solubilizing assistants. These solubilizers are generally useful in any type of extractive method using extracting solvents where the separation method is based on vapor-liquid contact. Solutions of these solubilizers have been found to be particularly valuable in vapor-liquid contacting methods for simultaneous hydrolysis and extractive distillation methods for separation of mixtures containing relatively close-boiling aldehydes and alcohols as well as their condensation products of the acetal type. It is probable that the solubilizer exercises a dual role of speeding up the hydrolysis and altering the relative volatilities of the components thereby making separation easier and more complete.

Since the hydrolytic reaction and the fractionation separation should be carried out only under acidic conditions, it is considered, that any solubilizers employed should be stable in acid solution and should be relatively inert and non-reactive with the materials present in the feed to be separated. These useful solubilizers can be a wide variety of organic compounds which promote to a more or less degree increased solubilities of the acetals, unsaturated ethers and other reaction products subject to hydrolytic action in the aqueous acidic solvent phase as well as influence the relative volatilities of the aldehydic and alcoholic components being separated into chemically pure fractions. Many of these chemicals which are sometimes designated collectively as hydrotropic agents are known and described in the literature, since their properties have made them useful in other fields. In the art, the term hydrotropic agents is used for highly polar compounds which, when added to a polar liquid, increase the solubility of solutes in that liquid. Those which are most useful for this invention are hydrotropic organic solubilizers and are preferably salts of organic compounds, which are of particular use in promoting solubilities in aqueous phase solvents. They should be capable of dissolving in water or other selective polar solvents containing at least some water in order to form a single liquid phase. In general, this requires the formation of a true solution, although a colloidally dispersed system is also possible. The solubility of the solubilizing agent in the aqueous phase should be of a relatively high order of magnitude. For best results in most combined reactions and separations, a solubility of at least 20 percent by weight of the solubilizer is required, although, broadly, concentrations of 5 to 70 percent or more of such solubilizer of adequate solubility may be employed.

For aqueous solutions the solubilizer compounds should have a basic carbon skeleton containing generally not more than twelve or fifteen carbon atoms, since compounds containing more than that number may have a relatively low solubility in water which may render them almost wholly useless as solubilizing agents. The carbon skeleton may be of the class of aliphatic, alicyclic, or aromatic and if it is of the cyclic type, may be either carbocyclic or heterocyclic in nature. It has been found that better solubilizers for the best results are those having cyclic aromatic nuclei which are of the aromatic series such as benzene, toluene, xylene, cymene and naphthalene. These solubilizers derived from the mononuclear aromatics are especially valuable because of high solubility and ready availability.

These nuclei must have as substituents one or more polar radicals or solubilizing groups such as a sulfonic acid, a carboxylic acid, a quaternary amine salt, a sulfate, or a phosphonate. These may be used in the form of the free acid or base or, preferably, they may be used as one or more of the salts which are much more soluble than the free acids. Suitable salts include the alkali metal salts such as sodium, potassium, or lithium. Also useful are the ammonium or amine salts. In most cases the water-soluble salts are especially desirable. In general the water-soluble salts of the mononuclear aromatic sulfonic acids have been found particularly valuable as hydrotropic organic solubilizers.

Other groups may also be present on the solubilized nuclei and these groups are often highly desirable. Groups of this type which may be present include alkyl, halogen, hydroxy, nitro, alkoxy, and amino both substituted and unsubstituted. The soluble salts of alkylated aromatic sulfonates have been found particularly useful as solubilizers.

A large number of salts, and in some restricted cases the acids, can be used as solubilizers. These include the sodium, potassium, lithium, ammonium, and amine salts of acids.

As specific examples of compounds which are useful there may be named the water-soluble salts of benzene sulfonic acid, salicylic acid, phthalic and terephthalic acids, toluene sulfonic acids, xylene sulfonic acids, cymene sulfonic acids, naphthalene sulfonic acids, dimethylaniline sulfonic acid, naphthol sulfonic acids, naphthylamine sulfonic acids, nitrobenzene sulfonic acids, chlorobenzoic acids, thiophene carboxylic acids, nitrophthalic acid, camphoric acid, cyclohexane sulfonic acid, taurine, amino acids, lauryl sulfonic acid, methane and ethane sulfonic acids, ethionic acid, furoic acid, citric acid, acetic acid, butyric acid, and anthraquinone sulfonic acids. Substituted amine salts, for instance, pyridinium salts such as the chlorides and sulfates, which are water soluble are also to be considered within the scope of this invention. A specific example is trimethyl phenyl ammonium hydroxide and its soluble salts.

The water-soluble salts, and particularly the readily available sodium salts, of the sulfonic acids have been found particularly convenient since they give superior results as solubilizers and, in addition, are readily available by standard sulfonation techniques.

It is considered within the scope of this invention to employ either single hydrotropic agents or mixtures of such agents.

Under certain conditions of operation, a variety of non-aqueous types of solvents can be used either in conjunction with the solubilizers or alone and these offer valuable solubilizing and separation advantages. In general, the non-aqueous solvents which are useful are those which are, at least to a considerable extent, miscible with water, thus having somewhat similar solvent properties to aqueous mixtures. Typical examples are the lower aliphatic alcohols such as methyl and ethyl alcohols. As further examples of this type of solvent there may be included glycerol, dioxane, and ethylene glycol.

The solvent which gives the maximum combined effect of hydrolysis and fractionation should be maintained below pH 7 and preferably rather critically within pH limits of 1 to 5. Basic solutions do not function properly as solvents, since aldehydes and carbonyl compounds generally give undesirable polymerization and irreversible condensation reactions under alkaline conditions, especially when the carbonylic groups are exposed to such alkaline conditions at elevated temperatures.

The proper acidic conditions may be obtained in a number of ways; for instance, by the direct addition to the fractionation zone of an acid or of the acidified aqueous solvent. The type of acid to be used varies widely and may include generally both volatile and non-volatile acids and those of both organic and inorganic types since the acids employed need only supply sufficient hydrogen ion to maintain the acidity, the anion being unimportant so long as it is unreactive and does not create separation difficulties. Not only can the acids themselves be used, but also there may be employed materials such as an acid reacting salt which will produce the necessary pH conditions. Examples of chemicals which can be employed for obtaining acid conditions necessary for hydrolysis are hydrochloric acid, sulfuric acid, acetic acid, ammonium chloride, phosphoric acid, trichloroacetic acid and chloroacetic acid. Acidic material which would exert an oxidative effect on the alcohol and aldehyde are particularly to be avoided since valuable products may thus be lost and further contaminating materials introduced at the same time into the system.

The fractionating or rectifying tower used for carrying out this combination hydrolysis and extractive distillation process should be supplied with suitable plates or packing for efficient countercurrent contact of the aqueous acidified solvent liquid and vapor and should contain a substantial number of plates below the feed inlet to give a sufficient hydrolytic reaction zone and a number of plates between the feed and overhead take-off lines to act as a rectification zone. A third zone may also be provided in the column above the aqueous recycle solvent supply line or the total solvent supply line if the solvent is not put into the column with the feed to provide for a water rectification section, although this is not absolutely necessary. The feed stock containing aldehydes, alcohols, acetals, and other products should be introduced together with the solvent, that is, the water, the acidulating material, and the solubilizer into the fractionating zone at an intermediate point. It has been found particularly satisfactory and efficient to carry out the combined process in a continuous manner. As an alternative method of operation, the aqueous solvent can be introduced into the fractionating tower at a point below the overhead take-off line for the removal of the more volatile products but above the inlet line for the organic feed. A specific embodiment of the invention is shown in Figure 1 and will be described in detail below in Example 1.

Vapor-liquid extraction methods employing these hydrotropic agents may be carried out at atmospheric, superatmospheric, and sub-atmospheric pressures. Use of superatmospheric pressures is advantageous in some cases in that it both allows higher temperatures which speeds up the hydrolysis effect of the solvent and at the same time gives greater solubility of the hydrotropic salts and consequently higher solubilities of the organic products, particularly the acetals and other higher molecular weight compounds, thereby permitting the hydrolytic reaction to be carried out essentially in a one-phase system. Sub-atmospheric pressures permit operation at lower temperatures; however, the decreased capacity of the aqueous phase for dissolving organic products may be a decided disadvantage. Extractive distillation combined with a hydrolytic action may be carried out at various temperatures ranging from about 70° C. up to about 180° C. The effectiveness of the hydrolyzing solvent has a direct correlation with the optimum temperature to be employed.

It is necessary for most efficient operation of the process that there be maintained a single phase liquid system within the fractionation zone. Thus the concentration of aqueous solvent present is directly influenced by the solubility limitations of the organic products in the particular concentration of aqueous solvent solution employed for the reaction and separation, since it is preferable for efficient operation to stay below the concentration at which two phases, an organic phase and an aqueous solvent phase, would be formed. However, for efficient operation it is desirable to have as high a ratio of organic feed stock solvent as it is possible to maintain within the fractionating tower and still stay within the preferred one phase concentration limit.

The residence time of the organic feed, and particularly the acetals, hemiacetals, ketals, unsaturated ethers, and other reaction products which must undergo hydrolytic splitting before the maximum yields of aldehydes and alcohols can be recovered is also a critical variable. While a small quantity of unhydrolyzed acetals can be recycled from the bottoms back to the fractionating zone, it is more desirable to adjust the velocity of feed input and product removal with respect to the overall size and physical characteristics of the column and in accordance with the composition of the feed stock in a coordinated manner such that recycling of unhydrolyzed acetal is held to a minimum.

The hydrolysis reaction is quite rapid, and, generally speaking, there will be adequate hydrolysis time. One factor involved is that an obvious advantage is achieved with acetals, hemiacetals and unsaturated ethers, which are miscible or at least to a large extent, miscible, in the aqueous hydrolyzing solvent. In some cases where the molecular weight of the acetal and the solubilizing effect obtained in the heated zone within the tower renders the acetal at least substantially soluble, an organic solubilizer will not be necessary, however, the hydrolysis will generally be found to proceed much more rapidly and smoothly as well as more nearly to completion if a solubilizer in an amount at least of the order of 5% by weight of the aqueous solvent is employed.

No unusual problems are encountered in recovering the separated components since the compounds, particularly the aldehydes, which are generally more volatile, are removed overhead or at least from some point at a relatively upper location in the fractionating zone together with varying amounts of water, depending on the presence or absence of azeotrope formation and on its relative composition in terms of the individual components. The higher boiling components can be removed from the lower portion of the tower, either as an aqueous side stream or as a bottoms stream in which case the bottoms product may be diluted to give effective phase separation. The compounds which are removed as aqueous streams can be recovered by condensation and subsequent separation of any aqueous phase which is produced. This mode of separation is only applicable to isolation of aldehydes and alcohols which are substantially water-insoluble. For soluble or partially soluble products, as propionaldehyde and butyraldehyde, and the corresponding soluble alcohols, a somewhat modified procedure is necessary, such as fractionation, or if azeotropes are formed with water, a third component may be added as required in order to recover the pure products. Other useful methods are extractive distillation with salt solutions or a salting out of the desired component. Any unhydrolyzed acetals are removed as bottoms and may be recycled to the reaction zone.

The invention will be more completely understood by reference to the examples set forth below.

These examples should be interpreted in conjunction with the accompanying Figure 1 for a more specific description of this continuous combined hydrolytic and extractive distillation process.

EXAMPLE 1

A mixture of aldehydes and alcohols of approximately the same carbon content and containing substantial amounts of acetals, hemiacetals, unsaturated ethers, and other hydrolyzable reaction products as obtained from the Oxo process by oxonation and hydrogenation is fed continuously to fractionating bell-cap tower 2 at an intermediate in let point 1 through line 36. By means of lines 1 and 35 there is also introduced into the tower at the same point an approximately 20 weight per cent water solution of the sodium salt of mixed xylene sulfonic acids whose acidity has been adjusted with sulfuric acid to a pH of about 1–5. A reboiler 3 with suitable heating means is used to provide continuous vaporization of a portion of the aqueous hydrolytic solvent and feed stock within the tower. In the presence of the acidified sodium xylene sulfonate solubilizer the acetals and other hydrolyzable products are dissolved in the aqueous solvent solution and hydrolysis of the acetals and other compounds takes place within the lower zone below the feed plate, thus producing quantities of aldehydes and alcohols in addition to those present as such in the feed. The presence of the water solution and its content of solubilizer alters the relative volatilities of the aldehydes and alcohols, making the aldehydic products show increased volatility over the alcoholic products. In the upper or rectification portion of the tower, essentially pure aldehyde is separated and is removed together with some water as an overhead vapor stream from the top of the tower through outlet line 6 and liquefied by means of condenser 7. In case the aldehyde is essentially immiscible with water, as is the usual case with aldehydes derived from Oxo mixtures, the condensate is sent by line 16 to a continuous decanter 17 in which there is formed an upper oil or aldehyde phase and a lower aqueous phase. The upper product phase is removed by line 18 and a part may be returned if desired as reflux to fractionating tower 2 by lines 20 and 15. A part is removed as a substantially pure aldehyde product fraction by line 19. The lower aqueous layer is removed from the phase separator 17 by line 21. All or a part, as necessary, of this aqueous layer is returned by lines 23 and 15 to the tower as additional reflux and, if desired, a part may be removed by line 22 to control solubilizer concentration and the general operational factors of the tower. From the bottom of the tower there is removed through line 4 the aqueous acidified solvent enriched in the alcohol components and containing any unhydrolyzed acetals. At least part of this mixture can be recycled through reboiler 3 back to the tower through inlet 5 for heating purposes and to control residence time. A part of the mixture removed at outlet 4 is introduced at an intermediate point 10 into the stripper fractionating tower 11. This tower 11 is provided with suitable heating means as a heating coil 12 to maintain temperature sufficient to give substantially complete stripping of an alcohol enriched aqueous fraction from the aqueous solubilizer solution and any high boiling organic contaminants. If so desired, steam may be injected through line 37 into stripping tower 11. An aqueous alcohol fraction is removed from the upper portion of the stripping tower 11 by line 13, liquefied by condenser 14, and sent by line 24 to a continuous decanter 31. For such operations the alcohol product must be substantially immiscible with water. The upper alcohol phase is removed by line 25 and a part may be recycled by line 27 back to stripping tower 11 as reflux, while a portion is removed by line 26 as an essentially pure alcohol fraction. From the lower portion of the continuous decanter there is removed an aqueous fraction by line 28, a major portion or all of which may be recycled back to the stripping tower by lines 30 and 27. A part of this aqueous phase can be removed from the system, if desired, by line 29. The lean aqueous solution is taken from the bottom outlet 8 of the stripper tower and, if desired, all or a part can be recycled through lines 9 and 15 back to the fractionating tower 2.

As an alternate, or supplementary mode of operation, an aqueous alcohol enriched side stream can be removed from fractionating tower 2 at a location one or two plates above the bottom through line 32 and since this fraction, generally speaking, will contain less contaminants than an alcohol bottoms stream removed through line 4, it can be passed directly through lines 32 and 25 into the alcohol and water phase decanter 31.

EXAMPLE 2

Using a process analogous to that described above, the data shown in Table I was obtained. Run 3 was carried out without the use of any solubilizer material while Runs 1 and 2 employed as a solvent a 20 weight per cent water solution of the sodium salt of mixed xylene sulfonic acids.

Table I
HYDROLYSIS AND SEPARATION OF C₄ ALDEHYDE AND ALCOHOL MIXTURE

| Run | 1 | 2 | 3 |
|---|---|---|---|
| Feed Composition (wt. percent) | (a) | (b) | (b) |
| Alcohol as C₄ | 26.9 | 43.2 | 41.0 |
| Aldehyde as C₄ | 17.1 | 7.0 | 7.9 |
| Acetal as C₁₂ | 43.4 | 47.1 | 44.0 |
| Ester as C₈ | 10.1 | 2.2 | 2.5 |
| Acid as C₄ | 0.7 | 0.9 | 0.4 |
| Water | 3.8 | -------- | 7.3 |
| Feed Rate, cc./hr | 250 | 300 | 378 |
| Aldehyde Product (wt. percent) | 33.5 | 25.6 | 17.3 |
| Alcohol as C₄ | 4.5 | 6.1 | <4 |
| Aldehyde as C₄ | 91.3 | 89.5 | 88 |
| Water | 2.7 | 3.0 | 4.3 |
| Acetal as C₁₂ | 2.4 | -------- | <5 |
| Rate, cc./hr ᵈ | 83.5 | 77 | 65.5 |
| Reflux ratio | 15:1 | 15:1 | 2:1 |
| Aldehyde, Yield Percent | 94 | 92 | 65 |
| Alcohol Product (wt. percent) | 74.4 | 71.6 | 60.5 |
| Alcohol as C₄ | 76.9 | 79.5 | 75.3 |
| Aldehyde as C₄ | 0.7 | 0.2 | 3.7 |
| Water | 18.5 | 20.9 | 18.3 |
| Acetal | 0.4 | 0.0 | 2.6 |
| Rate, cc./hr ᵈ | 185 | 215 | 229 |
| Reflux ratio | 2:1 | 2:1 | 1:1 |
| Solvent: | | | |
| Solubilizer (wt. percent) | ᶜ 20 | ᶜ 20 | 0 |
| Rate, cc./hr | 300 | 348 | 2420 |
| Approx. mol percent | 56.2 | 61.0 | 99.5 |
| pH | 1.0–2.5 | 4.8 | 1.5–5 |

ᵃ Feed material prepared by oxonation of propylene in butanol.
ᵇ Synthetic feed from acetallization of 3 volumes of n-butanol with one volume of n-butyraldehyde.
ᶜ Sodium salt of the mixed xylene sulfonic acids.
ᵈ Organic phase.

A comparison of Run 3, in which no solubilizer was used with Runs 1 and 2, using a solubilizer, shows the advantage of greatly reduced water requirements obtained when operating with the solubilizer since a much higher water content was required on the plates, and products were obtained in lower yields when no solubilizer was present in the aqueous solvent. Thus it was necessary to operate at 99 mole per cent aqueous solvent when no solubilizer was used while 56 mole per cent solvent could be used when solubilizer was added. The yield of aldehyde was 92% with solubilizer and 65% without it. The product purity, on a dry basis, was 92.6% for the aldehyde and 98.6% for the alcohol.

The feed used in this process can be any mixture containing aldehydes and alcohols and either containing, or potentially capable of forming, acetals and other reaction products. The process is especially applicable for oxo products containing from three to sixteen carbon atoms and finds greatest utility for products in the C₃ to C₉ range. It is further contemplated that the crude aldehyde product obtained directly from the oxonation stage may be employed, or there may be used the crude alcohol after the hydrogenation, the partially purified products, aldehyde and alcohol products, or the bottoms remaining after distilling a part or all of the aldehyde or alcohol.

EXAMPLE 3

This combined hydrolysis and extractive distillation was used to separate oxygenated products produced in a continuous operation by reacting an olefinic C₇ hydrocarbon feed stock of 180°–210° F. boiling range with H₂ and CO in the presence of a catalyst to give a carbonylic product, followed by catalytic hydrogenation. The data obtained on this product is shown in Table II. Run 1 shows the results obtained when hydrocarbon products were allowed to remain in the feed. These hydrocarbons are recovered as part of the overhead stream with the aldehyde and can be removed subsequently. Run 2 shows the results when the major portion of the hydrocarbon was removed from the feed stock as a preliminary step and 66.3% of the bottoms so obtained used as feed stock to fractionating tower 2. Run 3 shows the data which was obtained when an aldehyde-alcohol mixture, freed of hydrocarbon components by a distillation, was subjected to this combined hydrolysis and extractive distillation. Aldehyde of 100% purity was obtained as the overhead product. The composition of the feed was determined by infra-red analysis in each case. In each case the alcohol is recovered in stripping tower 11 as an overhead stream and high boiling products, not hydrolyzable under acidic conditions and remaining as bottoms in tower 11 may, if desired, be recovered in a third zone.

Table II
HYDROLYSIS AND SEPARATION OF C₈ ALDEHYDE AND ALCOHOL MIXTURE

| Run | 1 | 2 | 3 |
|---|---|---|---|
| Feed Composition (vol. percent): | | | |
| C₈ aldehyde | 35.8 | 33.0 | 28.2 |
| C₈ alcohol | 5.6 | 11.8 | 11.0 |
| C₂₄ acetal | 14.6 | 29.8 | 38.3 |
| C₁₆ unsat. aldehyde | 4.1 | 16.5 | 15.3 |
| C₇ hydrocarbon | 39.9 | 8.9 | 0.0 |
| C₈ ester | -------- | -------- | 7.2 |
| Overhead Product (vol. percent): | | | |
| C₈ aldehyde | 33 | 79.4 | 100 |
| C₇ hydrocarbon | 67 | 20.6 | 0.0 |
| Feed rate, cc./hr | 166 | 246 | 256 |
| Overhead product rate, cc./hr | 103 | 75 | 84 |
| Reflux ratio | 15:1 | 15:1 | 2:1 |
| Solvent: | | | |
| Solubilizer (wt. percent) | ᵃ 45 | ᵃ 50 | ᵃ 50 |
| Rate, cc./hr | 2,280 | 2,590 | 2,460 |
| pH | 1 | 1 | 1 |
| Approx. Mol. percent | 94.5 | 95.4 | 94.8 |

ᵃ Sodium salt of para-cymene sulfonate.

It is also contemplated that this combined hydrolysis and extractive distillation process can be used to separate very pure products, and particularly pure aldehyde, by conversion of aldehydes to acetals followed by purification of the acetals followed by hydrolysis of the acetals and isolation of the aldehydes by this process. This is particularly useful in separating aldehydes from mixtures in which the boiling points of the aldehydes and other components are very close. The process may also be employed in a similar manner to separate alcohols from mixtures by forming an acetal with a suitable aldehyde.

What is claimed is:

1. A method for the separation and recovery of aldehydes and alcohols from a mixture of oxygenated compounds obtained by the oxo reaction, said mixture containing close-boiling oxygenated components including aldehydes, alcohols, acetals, hemiacetals, and unsaturated ethers, which comprises subjecting said mixture to a simultaneous hydrolysis and extractive distillation using as an extraction solvent a dilute aqueous acidic solution having a pH in the range of 1 to 5 and containing in solution at least 20% by weight of a water-soluble salt of a mononuclear aromatic sulfonic acid, whereby the acetals, hemiacetals, and unsaturated ethers are hydrolyzed, those components which are relatively more volatile in the presence of the aqueous solvent are separated from those components which are relatively less volatile.

2. A method for the separation and recovery of aldehydes and alcohols of the C₃ to C₁₆ range from mixtures containing aldehydes and alcohols which are capable of reacting together to form higher molecular weight reaction products which comprises subjecting said mixtures to a simultaneous hydrolysis and extractive distillation using as an extraction solvent a dilute aqueous acidic solution having a pH in the range of 1 to 5 and containing in solution at least 5% by weight of a water-soluble salt of a mononuclear aromatic sulfonic acid, maintaining the said extraction solvent in a concentration of 40 to 99 mol per cent, whereby any of said reaction products initially present undergo hydrolysis to carbonyl and hydroxyl compounds, further reactions between aldehydes and alcohols are suppressed, and the aldehydes which are relatively more volatile are separated from the alcohols which are relatively less volatile.

3. A method according to claim 2 in which the mixtures containing aldehydes and alcohols are obtained by the Oxo reaction.

4. A process according to claim 3 in which the water-soluble salt of the mononuclear aromatic sulfonic acid is the sodium salt of mixed xylenesulfonic acids.

5. A process according to claim 3 in which the water-soluble salt of the mononuclear aromatic sulfonic acid is the sodium salt of par-cymene sulfonic acid.

6. A method for the separation and recovery of aldehydes and alcohols of the $C_3$ to $C_9$ range from mixtures containing aldehydes and alcohols which are capable of reacting together to form higher molecular weight reaction products which comprises subjecting said mixtures to a simultaneous hydrolysis and extractive distillation using as an extraction solvent a dilute aqueous acidic solution having a pH in the range of 1 to 5 and containing in solution at least 20% by weight of a water-soluble salt of a mononuclear aromatic sulfonic acid, whereby any higher molecular weight reaction products initially present undergo hydrolysis to aldehydes and alcohols, further condensations between aldehydes and alcohols are suppressed, and the aldehydes which are relatively more volatile are separated from the alcohols which are relatively less volatile.

7. A method according to claim 6 in which the mixture containing aldehydes and alcohols are obtained by the Oxo reaction.

8. A method for the separation and recovery of aldehydes and alcohols of the $C_3$ to $C_9$ range from mixtures of oxygenated compounds containing aldehydes, alcohols, acetals, hemiacetals, unsaturated ethers and other reaction products, which comprises subjecting said mixtures to a simultaneous hydrolysis and extractive distillation using as an extraction solvent a dilute aqueous acidic solution having a pH in the range of 1 to 5 and containing in solution about 20% by weight of a water-soluble salt of a mononuclear aromatic sulfonic acid, maintaining the said extraction solvent in a concentration of 40 to 99 mol per cent, whereby the acetals, hemiacetals, unsaturated ethers and other reaction products undergo hydrolysis to aldehydes and alcohols, and the aldehydes which are relatively more volatile are separated from the alcohols which are relatively less volatile.

9. A process according to claim 8 in which the mixtures containing aldehydes and alcohols are obtained by the Oxo reaction.

10. A combined continuous hydrolysis and extractive distillation process for the separation and recovery of close-boiling aldehydes and alcohols of the $C_3$ and $C_9$ range from a mixture of oxygenated organic compounds containing aldehydes, alcohols, acetals, hemiacetals, unsaturated ethers, and other reaction products which comprises introducing said mixture of oxygenated organic compounds into an intermediate point of a fractionating zone, passing downwardly through said fractionating zone as an extraction solvent, a dilute aqueous acidic mixture containing about 20% by weight of a water-soluble salt of a mononuclear aromatic sulfonic acid, and having a pH in the range of 1 to 5, maintaining continuous reboiling and refluxing within the zone, maintaining a concentration of 40 to 99 mol per cent of said extraction solvent within the zone, whereby the acetals, hemiacetals, unsaturated ethers, and other reaction products are hydrolyzed, removing from an upper portion of the zone a vapor stream rich in aldehydes and removing from a lower portion of the zone a fraction rich in alcohols.

11. A method according to claim 10 in which there is fed to the fractionating zone a mixture of close-boiling $C_4$ aldehydes and alcohols additionally containing higher molecular weight compounds and prepared by the Oxo reaction using propylene as the olefin feed.

12. A method according to claim 10 in which the water-soluble salt of the mononuclear aromatic sulfonic acid is the sodium salt of the mixed xylene sulfonic acids.

13. A method according to claim 10 in which the water-soluble salt of the mononuclear aromatic sulfonic acid is the sodium salt of paracymene sulfonic acid.

14. A combined continuous hydrolysis and extractive distillation process for the separation and recovery of close-boiling $C_8$ aldehydes and alcohols from a mixture of oxygenated organic compounds containing aldehydes, alcohols, acetals, hemiacetals, unsaturated ethers, and other reaction products obtained by the Oxo reaction using a $C_7$ olefin stream which comprises introducing said mixture of oxygenated organic compounds into an intermediate point of a fractionating zone, passing downwardly through said fractionating zone as an extraction solvent, a dilute aqueous acidic mixture containing at least 20% by weight of a water-soluble salt of a mononuclear aromatic sulfonic acid and having a pH in the range of 1 to 5, maintaining continuous reboiling and refluxing within the zone, maintaining a concentration of 40 to 99 mol per cent of said extraction solvent within the zone, whereby the acetals, hemiacetals, unsaturated ethers, and other reaction products are hydrolyzed, removing from an upper portion of the zone a vapor stream rich in aldehydes and removing from a lower portion of the zone a fraction rich in alcohols.

15. A method according to claim 14 in which the soluble salt of the mononuclear aromatic sulfonic acid is sodium para-cymene sulfonate.

16. A method for the recovery of aldehydes and alcohols from a mixture containing aldehydes and alcohols capable of reacting together to form higher molecular weight acetal reaction products, which comprises subjecting said mixture to an extractive distillation under hydrolytic conditions using as an extraction solvent a dilute aqueous acid solution having a pH below 7 and containing in solution at least 5% by weight of a water-soluble salt of a mononuclear aromatic sulfonic acid, whereby any condensed products initially present undergo hydrolysis to carbonyl and hydroxyl compounds, further reactions between aldehydes and alcohols are suppressed, and the carbonyl compounds including the aldehydes which are rendered more volatile are separated from the hydroxyl compounds including the alcohols which are rendered less volatile.

CHARLES E. MORRELL.
JOSEPH STEWART.
CARL S. CARLSON.

REFERENCES CITED

The following references are of record in the file of this patent:

UNITED STATES PATENTS

| Number | Name | Date |
|---|---|---|
| 1,929,901 | Ricard | Oct. 10, 1933 |
| 1,933,505 | Merley | Oct. 31, 1933 |
| 2,321,748 | Hopkins | June 15, 1943 |
| 2,360,861 | Pierotti | Oct. 24, 1944 |
| 2,371,908 | Morris | Mar. 20, 1945 |
| 2,551,625 | Morrell et al. | May 8, 1951 |
| 2,552,412 | Drout et al. | May 8, 1951 |

OTHER REFERENCES

Booth et al. "Hydrotropic Solubilities," Industrial and Engineering Chemistry, vol. 40, pages 1491–1493 (Aug. 1948).

McKee "Use of Hydrotropic Solutions in Industry," Industrial and Engineering Chemistry, vol. 38, pages 382–384 (April 1946).